(12) United States Patent
Forse

(10) Patent No.: US 6,585,456 B2
(45) Date of Patent: Jul. 1, 2003

(54) COMBINATION ANCHORING PIN AND INSERTION APPARATUS

(75) Inventor: Scott E. Forse, McMurray, PA (US)

(73) Assignee: Johnston-Morehouse-Dickey, Co., Bethel Park, PA (US)

(*) Notice: Subject to any disclaimer, the term of this patent is extended or adjusted under 35 U.S.C. 154(b) by 40 days.

(21) Appl. No.: 09/813,734

(22) Filed: Mar. 21, 2001

(65) Prior Publication Data
US 2002/0134812 A1 Sep. 26, 2002

(51) Int. Cl.⁷ .......................... E21D 21/00; B25C 7/00; F16B 15/00
(52) U.S. Cl. ..................... 405/259.1; 405/258.1; 411/439; 227/110; 227/120; 227/147
(58) Field of Search ................ 405/259.1, 262, 405/284, 285, 302.6, 302.7; 52/155, 156, 158, 159; 411/439, 457, 920; 227/107, 110, 120, 129, 139, 147; 111/96, 106

(56) References Cited

U.S. PATENT DOCUMENTS

| | | | |
|---|---|---|---|
| 1,554,527 A | * 9/1925 | Saalfrank | 24/711 |
| 1,708,005 A | * 4/1929 | Wilson | 24/711 |
| 3,035,269 A | 5/1962 | Latsch et al. | 1/49 |
| 3,163,371 A | * 12/1964 | Hardy | 341/46.016 |
| 3,517,629 A | 6/1970 | Bridges et al. | 111/96 |
| 3,693,892 A | * 9/1972 | Musa | 241/46.016 |
| 3,706,115 A | * 12/1972 | Bleile | 411/470 |
| 3,801,998 A | * 4/1974 | Macias | 241/46.014 |
| 3,979,040 A | 9/1976 | Denin | 227/113 |
| 4,085,882 A | * 4/1978 | Stamper | 227/110 |
| 4,139,136 A | 2/1979 | Catalano | 227/109 |
| 4,377,919 A | 3/1983 | Gams | 47/1 R |
| 4,410,050 A | 10/1983 | Councell, Jr. et al. | 173/112 |
| D278,459 S | * 4/1985 | Cook | D6/86 |
| 4,627,563 A | 12/1986 | Meyer | 227/130 |
| 4,706,864 A | 11/1987 | Jacobsen et al. | 227/109 |
| 5,025,969 A | 6/1991 | Koester et al. | 227/120 |
| 5,211,722 A | 5/1993 | Wagner | 47/58 |
| 5,601,558 A | * 2/1997 | Torrie et al. | 411/495 X |
| 5,881,982 A | * 3/1999 | Hollingsworth et al. | 411/60 X |
| 5,997,213 A | * 12/1999 | Dennis et al. | 405/114 |
| 6,227,763 B1 | * 5/2001 | Kuhns | 405/38 |
| 6,237,289 B1 | * 5/2001 | Jewett et al. | 52/163 |
| 6,276,644 B1 | * 8/2001 | Jennings et al. | 411/410 X |
| 6,332,737 B1 | * 12/2001 | Mattson | 405/63 |

FOREIGN PATENT DOCUMENTS

| | | | | |
|---|---|---|---|---|
| DE | 3533951 | * | 4/1987 | 52/387 |
| DE | 3606113 | * | 8/1987 | 227/120 |
| JP | 03262827 | * | 11/1991 | 405/272 |
| JP | 7256570 | * | 10/1995 | |

* cited by examiner

Primary Examiner—Jong-Suk Lee

(57) ABSTRACT

A combination anchoring pin and insertion apparatus which includes a vertically disposed elongated barrel having an axial bore and an elongated hammer drive rod slidably received within the bore with the upper end extending above the top opening of the barrel and having a handle secured to the upper end of the rod. A side opening is provided in the barrel for sequentially introducing anchoring pins therethrough into the bore and a pin guide chute is secured to the barrel and aligned with this barrel side opening for sequentially feeding anchor pins through the side opening in guided alignment. An anchoring pin retainer is positioned in the barrel bore below the side opening to receive, retain and position the anchoring pins sequentially under the lower end of the drive rod for sequential downward driving engagement or hammering by the drive rod.

5 Claims, 3 Drawing Sheets

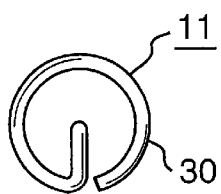 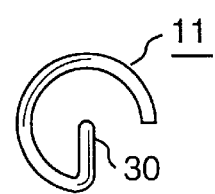 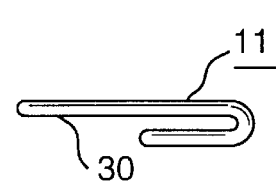 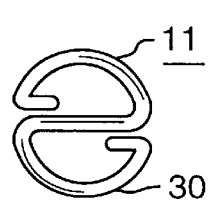
FIG. 8A   FIG. 9A   FIG. 10A   FIG. 11A
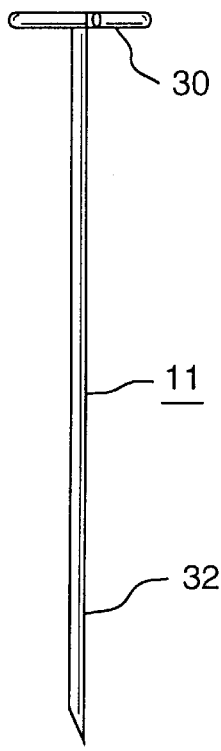 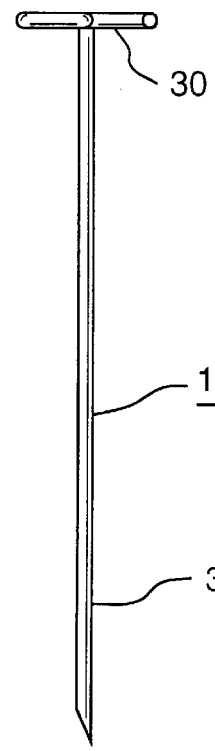 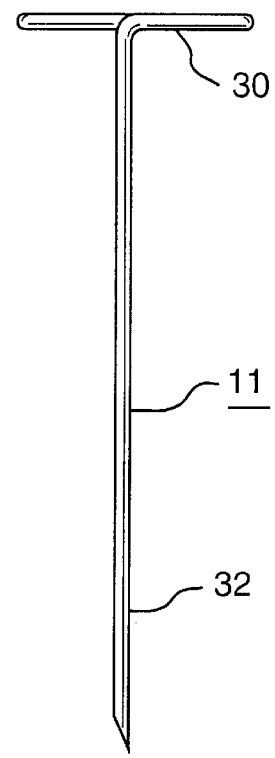 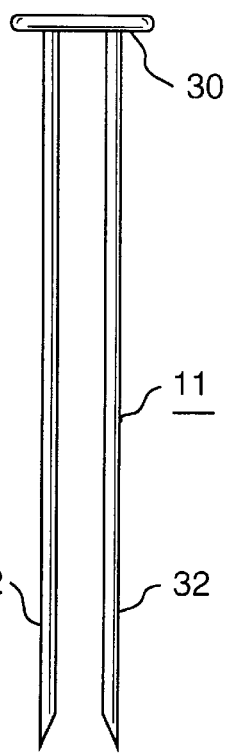
FIG. 8B   FIG. 9B   FIG. 10B   FIG. 11B

COMBINATION ANCHORING PIN AND INSERTION APPARATUS

FIELD OF THE INVENTION

This invention relates to apparatus for implanting fastener elements down through erosion control materials on the ground, such as, ground erosion control fabrics, particularly erosion control matting, geotextile fabric, and mulch netting and ground cover such as sod.

BACKGROUND OF THE INVENTION

A common practice is to lay erosion control materials, such as, matting or geotextile fabric over grass seedlings or sod, particularly on sloping ground bordering roads and highway interchanges. In other instances, a mulched netting is positioned over mulch and it is required to hold the netting in place so that the mulch layer does not erode. Accordingly, these materials must be fastened in place on the ground so that they will not be displaced by rain, water runoff or wind.

The usual practice has been to use a hammer for driving handheld staples down into the cover material and on into the ground. This task is very laborious and causes the worker to accomplish this task on his hands and knees or bent over to use the hammer.

A number of fastener implanting machines have been developed in order to overcome these difficulties such as illustrated in U.S. Pat. Nos. 4,627,563; 4,706,864 and 5,025,969. However, such devices have proven to be heavy and expensive to manufacture. They are also prone to jamming and excessive maintenance.

It is a principal object of the present invention to provide a combination anchoring pin and insertion apparatus therefore which alleviates or overcomes these shortcomings.

SUMMARY OF THE INVENTION

The combination anchoring pin and insertion apparatus of the present invention includes a vertically disposed elongated barrel having an axial bore with top and bottom openings and an elongated hammer drive rod that is slidably disposed or received within this bore with the upper end thereof extending above the top of the barrel opening. A handle is secured to the upper end of this drive rod.

A side opening is provided in the barrel and is dimensioned for sequentially introducing anchoring pins therethrough into the barrel bore. A pin guide chute is also secured to the barrel and aligned with this barrel side opening for sequentially feeding anchoring pins through the side opening in sequential guided alignment.

The anchoring pins used with the apparatus of the present invention have at least one pin shaft depending at a right angle downwardly from an enlarged head for driving engagement with the lower end of the drive rod. The drive rod is manipulated to drive the anchoring pin into underlying ground.

In accordance with one embodiment of the present invention, an anchoring pin retainer is disposed in the barrel bore below the side opening for receiving, retaining and positioning an anchoring pin under the lower end of the drive rod to preposition the anchoring pin for downward driving engagement of its head by the lower end of the drive rod. These anchoring pins are comprised of a continuous length of heavy gauge steel wire having a straight shaft portion and an enlarged coiled head portion transverse to the shaft at the upper proximal end of the shaft portion. The anchoring pin may include a second straight shaft portion depending downwardly from the head in parallel to the aforesaid shaft portion thereby effectively providing a staple with a very large round head for engagement with the lower hammering head of the drive rod. This large coiled head uniformly distributes the downward hammering blows to the pin head to thereby easily drive the pin shaft into the ground in a fast and straight fashion. The large head more importantly more securely holds the ground cover down than a conventional staple.

Another feature of the combination anchoring pin and insertion apparatus therefore of the present invention is that this anchoring pin retainer includes a flexible disk transversely disposed in the barrel which has a central opening to receive an anchoring pin shaft so that the pin is held in alignment in the bore with the head of the anchoring pin resting on the flexible disk. This flexible disk is further provided with an annular series of spaced slits radially extending from the central opening for thereby permitting forced enlargement of the central opening with penetration of the enlarged pin head and the lower end of the drive rod passing therethrough.

A bottom portion of the barrel below the side opening is removable or detachable and the retainer is thereby accessible and removably secured in position between this bottom portion of the barrel and the remaining upper portion of the barrel.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

FIGS. 8A, 9A, 10A and 11A are respective top or plan views of different anchoring pins made in accordance with teachings of the present invention for use in the insertion apparatus of the present invention; and FIGS. 8B, 9B, 10B and 11B are respectively views in side elevation of the anchoring pins shown in FIGS. 8A, 9A, 10A and 11A.

DETAILED DESCRIPTION OF THE PREFERRED EMBODIMENTS

Figure 1:
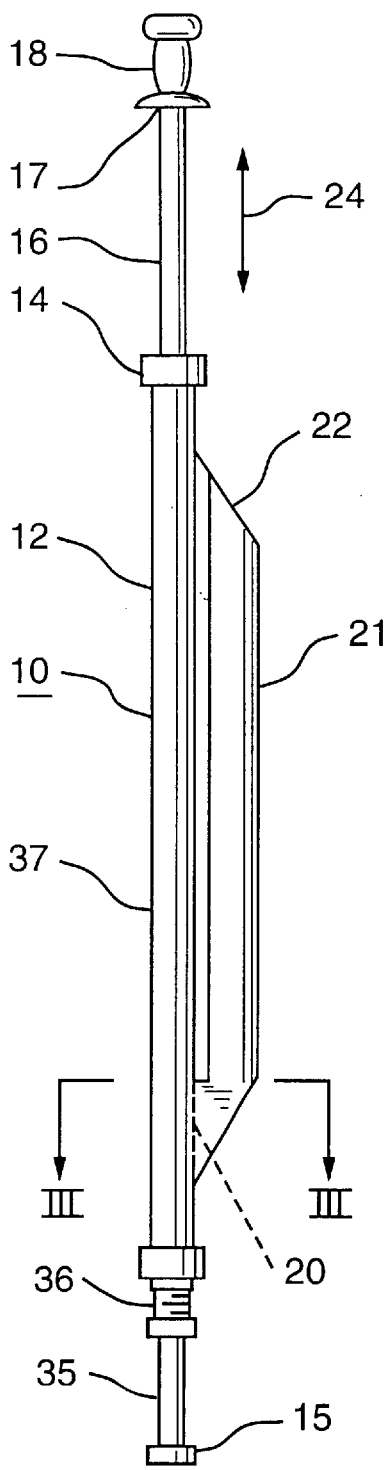
FIG. 1 is an overall view in side elevation of the pin insertion apparatus portion of the present invention showing the apparatus at a scale of about 1/10th of its actual size.
Figure 2:
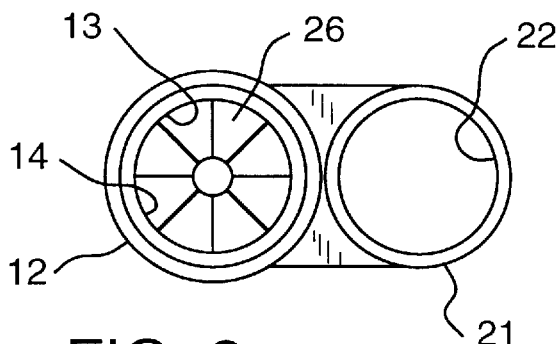
FIG. 2 is an enlarged top view of the apparatus shown in FIG. 1 with the centrally disposed elongated hammer drive rod removed.
Figure 3:
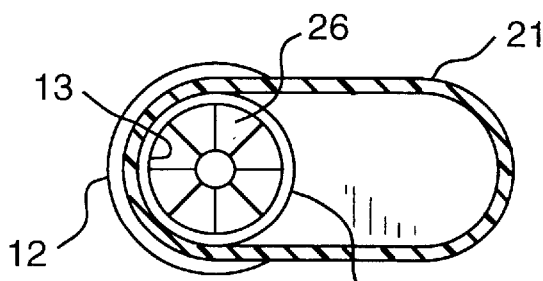
FIG. 3 is an enlarged plan view in horizontal cross section of the apparatus shown in FIG. 1 as seen along section line III—III, and of the same scale as illustrated in FIG. 2.
Figure 4:
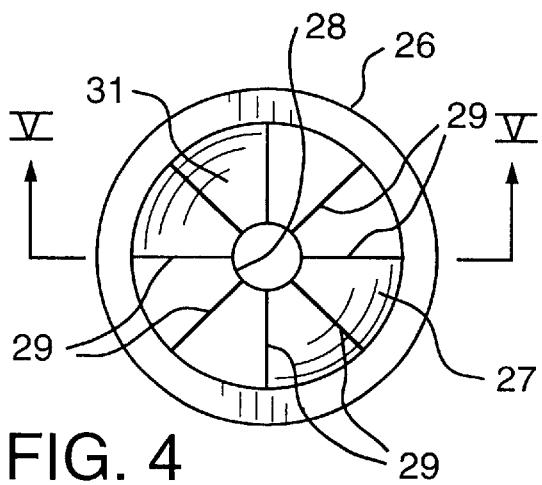
FIG. 4 is a plan view enlarged to full size of the anchoring pin retainer portion of the apparatus shown in FIGS. 2 and 3.
Figure 5:
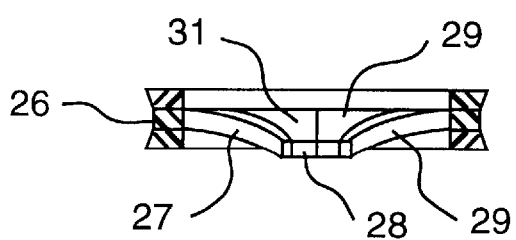
FIG. 5 is a view in vertical mid cross section of the pin retainer shown in FIG. 4 as seen along section line V—V.
Figure 6:
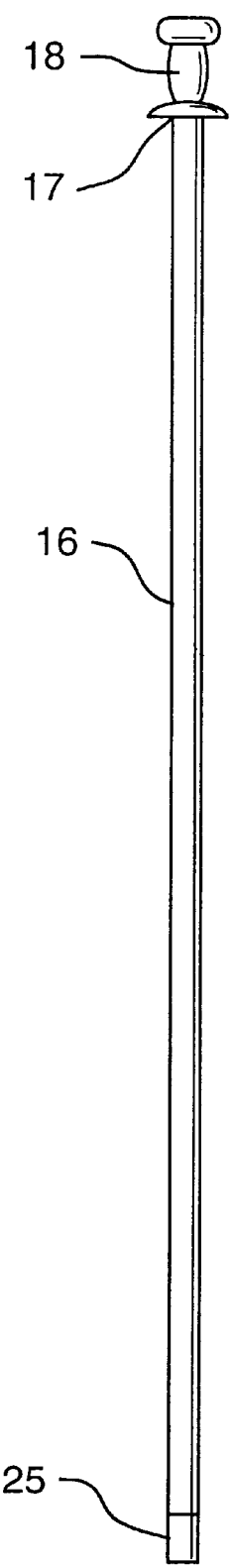
FIG. 6 is an enlarged view in side elevation of the elongated hammer drive rod shown alone without the barrel portion of the apparatus shown in FIG. 1.

Referring to the drawings, the combination anchoring pin and insertion apparatus of the present invention is illustrated. The insertion apparatus portion 10 of the combination is illustrated as totally assembled in FIG. 1 and the anchoring pins 11 of the present invention for use in apparatus 10 are illustrated in FIGS. 8 through 11. Anchoring pins other than those illustrated here may be utilized in the apparatus 10 of the present invention.

The insertion apparatus 10 includes a vertically disposed elongated barrel 12 having an axial bore 13 with top and bottom openings 14 and 15 respectively. An elongated hammer drive rod 16 is slidably disposed within bore 13 with an upper end 17 thereof above the top opening 14 and a handle 18 is secured to the upper end 17. A side opening 20 is provided in barrel 12 for sequentially introducing upright positioned anchoring pins therethrough into bore 13. A pin guide chute 21 having a top opening 22 is secured to barrel 12 and aligned with the barrel side opening 20 for sequentially feeding anchor pins, such as those illustrated in FIGS. 8 through 11, in an upright manner as illustrated through the side opening 20 in guided alignment.

The barrel 12 and chute 21 are integrally molded of high impact, lightweight, noncorrosive plastic material. The elongated hammer drive rod 16 is composed of a main body tube portion which is plastic tubing and handle 18 is also molded of plastic and secured to the upper end 17 of the tubing portion of rod 16. The lower end of elongated hammer drive rod 16 consists of a cylindrical steel end 25 secured to the lower end of the plastic tubing making up the main body of rod 16.

In operation, the operator will grasp handle 18 and pick up hammer drive rod 16 to the approximate position illustrated in FIG. 1 whereby the handle 18 is spaced from the upper end 14 of barrel 12. At this point, the lower steel end 25 of hammer drive rod 16 is above and clear of side opening 20. A pin, such as the pins 11 illustrated in FIGS. 8 through 11, is then inserted into top opening 22 of chute 21 in its upright position. The dimensions of the inner bore of chute 22 are such that the pins are set so that the pins 11 will feed sequentially downwardly therethrough in chute 21 and then on through side opening 20 in guided alignment into bore 13 of barrel 12. Once the pin has entered into bore 13 through side opening 20 and drops to the bottom of barrel 12, then the hammer drive rod 16 may be hammered downwardly against the head of the anchoring pins to drive into the ground as illustrated by the action arrow 24.

The insertion apparatus 10 of the present invention is further enhanced by the inclusion of anchoring pin retainer 26 disposed in bore 13 below side opening 20 for receiving, retaining and positioning an anchoring pin, such as anchoring pin 11, under the lower end 25 of drive rod 16 for downward driving engagement by the lower end of the drive rod 16. This anchoring pin retainer 26 includes a flexible disk 27 transversely disposed in barrel 13 and having a central opening 28 and an annular series of spaced slits 29 radially extending from central opening 28 for thereby permitting forced enlargement of the central opening 28 with penetration of the enlarged pin head 30 of pin 11 and the enlarged lower end 25 of rod 16 passing or penetrating therethrough. Prior to engagement of the enlarged round head 11 of a pin 11 by the lower end 25 of elongated hammer drive rod 16, the underside of the pin head 30 will lay against the top surface 31 of flexible disk 27 with the shaft 32 of the pin 11 extending downwardly on through opening 28 to hold the pins 11 in position prior to hammering the pin downwardly with drive rod 16.

Figure 7:
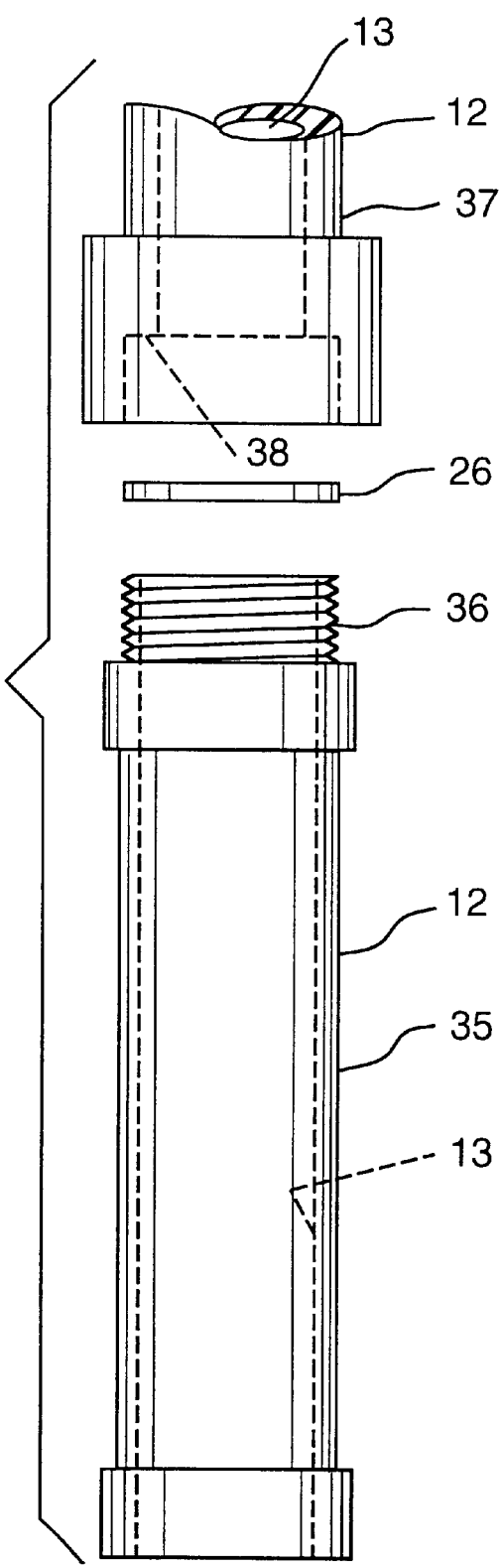
FIG. 7 is an enlarged exploded view in side elevation and shown in a scale which is about ½ that of actual size which illustrates the removable bottom portion of the barrel of the apparatus shown in FIG. 1 for access to the anchoring pin retainer illustrated in FIGS. 4 and 5.

The bottom portion 35 of barrel 12 is positioned below side opening 20 and is detachable by means of the upper threaded end 36, whereby the bottom portion 35 is threadably removable or detachable from the remaining upper portion 37 of barrel 12. This is best illustrated in FIG. 7. By threadably removing bottom portion 35 from the remaining upper portion 37, access is provided to anchoring pin retainer 26 which is normally seated by the threaded portion 36 of bottom portion 35 up against annular seat 38 in the upper end portion 37 of barrel 12. This asssembly provides easy access to retainer 26 which is prone to wear and may be replaced.

Referring to FIGS. 8 through 11, the anchoring pins 11 are shown to be comprised of a continuous length of heavy gauge steel wire having a straight shaft portion 32 and an enlarged coil head portion 30 transverse to shaft portion 32. These anchoring pins are constructed of heavy gauge steel wire such as 12 to 8 gauge. These large pin head portions 30 (typically ¾" to 1¾" in diameter) provide a desirably large area for impact by the hammer drive rod 16 and more importantly these large head portions 30 cover a large area whereby they more securely retain the ground erosion control fabric or other material or mesh securely to the ground.

The pin head configuration of head 30 shown in FIG. 8A is circular, while that shown in FIG. 9A does not complete a circle. The head configuration for the pin head portions 30 shown in FIG. 10A is illustrated as being straight whereby the overall pin 11 has a T configuration.

The anchoring pin 11 configuration shown in FIGS. 11A and 11B illustrate an anchoring pin that includes two straight shaft portions 32 which depend in parallel from each other at their proximal ends downwardly from the head portion 11. Again, this staple like configuration provides an anchoring pin which is still manufactured of one continuous length of heavy gauge wire.

I claim:

1. A combination anchoring pin and insertion apparatus therefore, comprising:

a) a vertically disposed elongated barrel having an axial bore with top and bottom openings;

b) an elongated hammer drive rod slidably disposed within said bore with an upper end thereof extending above said top opening and a handle secured to said upper end;

c) a side opening in said barrel dimensioned for sequentially introducing said anchoring pins therethrough into said bore;

d) a pin guide chute secured to said barrel and aligned with the barrel side opening for sequentially feeding said anchoring pins through said side opening in guided alignment;

e) each of said anchoring pins having at least one pin shaft depending at a right angle downwardly from an enlarged pin head for driving engagement with a lower end of said drive rod; and f) an anchoring pin retainer disposed in said bore below said side opening for receiving, retaining and positioning an anchoring pin under the lower end of said drive rod for downward driving engagement by said lower end of said drive rod, g) said anchoring pin retainer including a flexible disk transversely disposed in said barrel and having a central opening to receive the anchoring pin shaft and further having an annular series of spaced slits regularly extending from said central opening for thereby permitting forced enlargement of the central opening with penetration of said enlarged pin head and said lower end of said drive rod therethrough.

2. The combination anchoring pin and insertion apparatus of claim 1 wherein said anchoring pin is comprised of a continuous length of heavy gauge steel wire having a straight shaft portion and an enlarged coiled head portion transverse to said shaft at an upper proximal end of said shaft portion.

3. The combination anchoring pin and insertion apparatus of claim 2 wherein said anchoring pin includes a second straight shaft portion depending downwardly from said head in parallel to the aforesaid shaft portion.

4. The combination anchoring pin and insertion apparatus of claim 1 wherein a bottom portion of said barrel below said side opening is detachable and said pin retainer is removably secured in position between said bottom portion and a remaining upper portion of said barrel.

5. In an anchoring pin insertion apparatus including a vertically disposed elongated barrel having an axial bore with top and bottom openings, an elongated hammer drive rod slidably disposed within said bore with an upper end thereof extending above said top opening and a handle secured to said upper end, and a side opening in said barrel dimensioned for sequentially introducing anchoring pins therethrough into said bore; an anchoring pin retainer for disposition in said bore below said side opening for receiving, retaining and positioning an anchoring pin under a lower end of said drive rod, said anchoring pin retainer comprised of a flexible disk for transverse mounting in said barrel and having a central opening to receive an anchoring pin shaft and further having an annular series of spaced slits radially extending from said central opening for thereby permitting forced enlargement of the central opening with penetration of an enlarged pin head and said lower end of said drive rod therethrough.

* * * * *